Patented Aug. 30, 1932

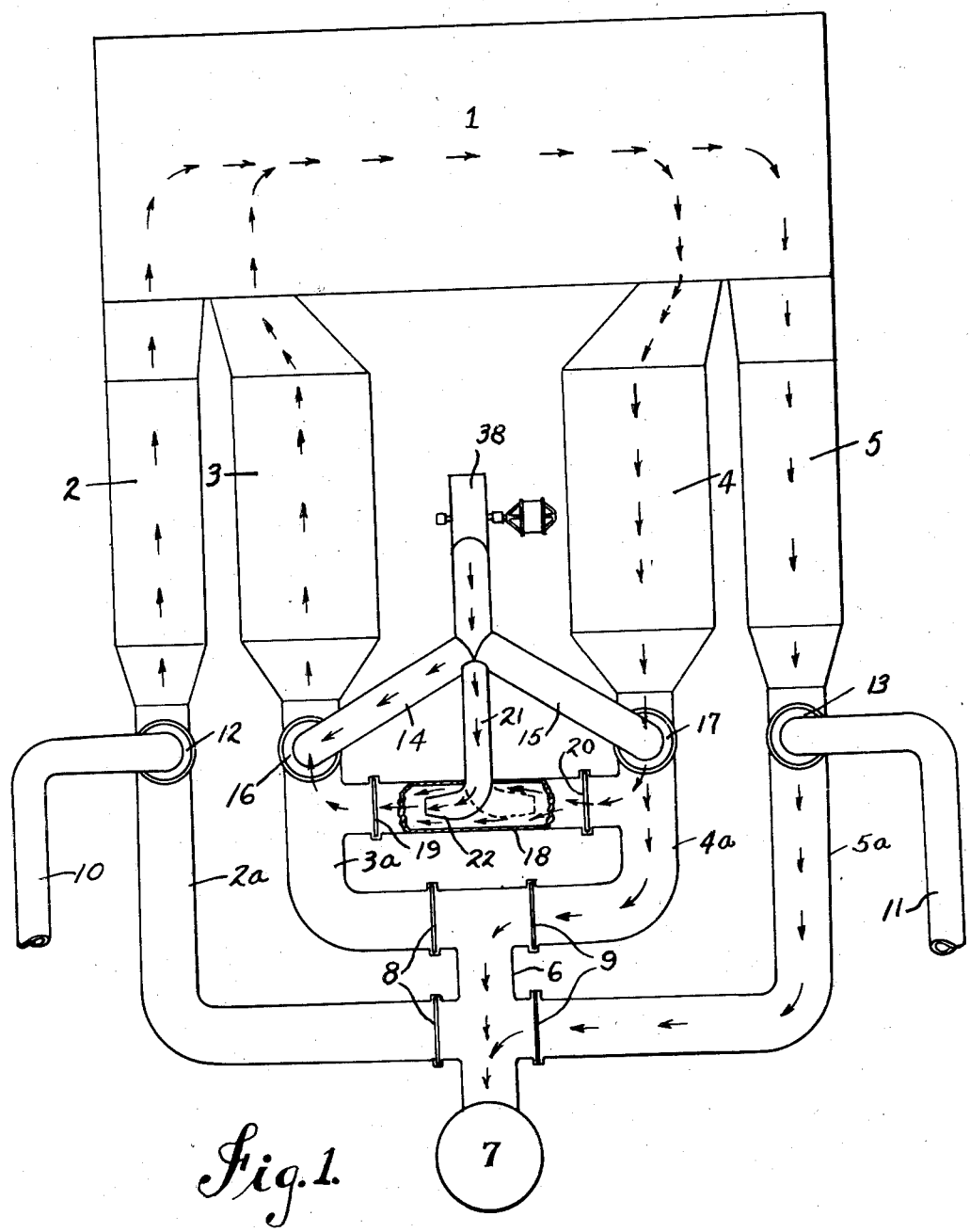

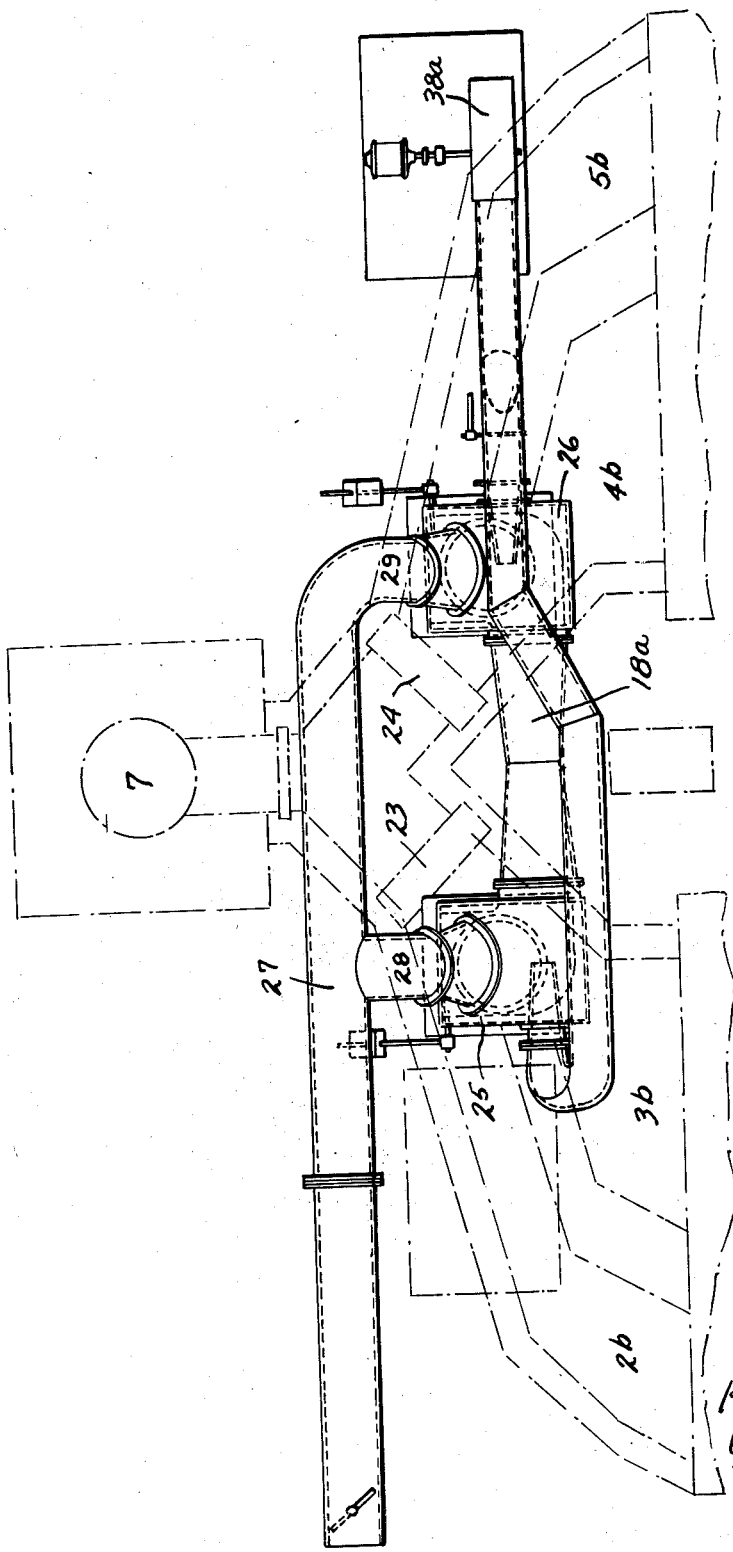

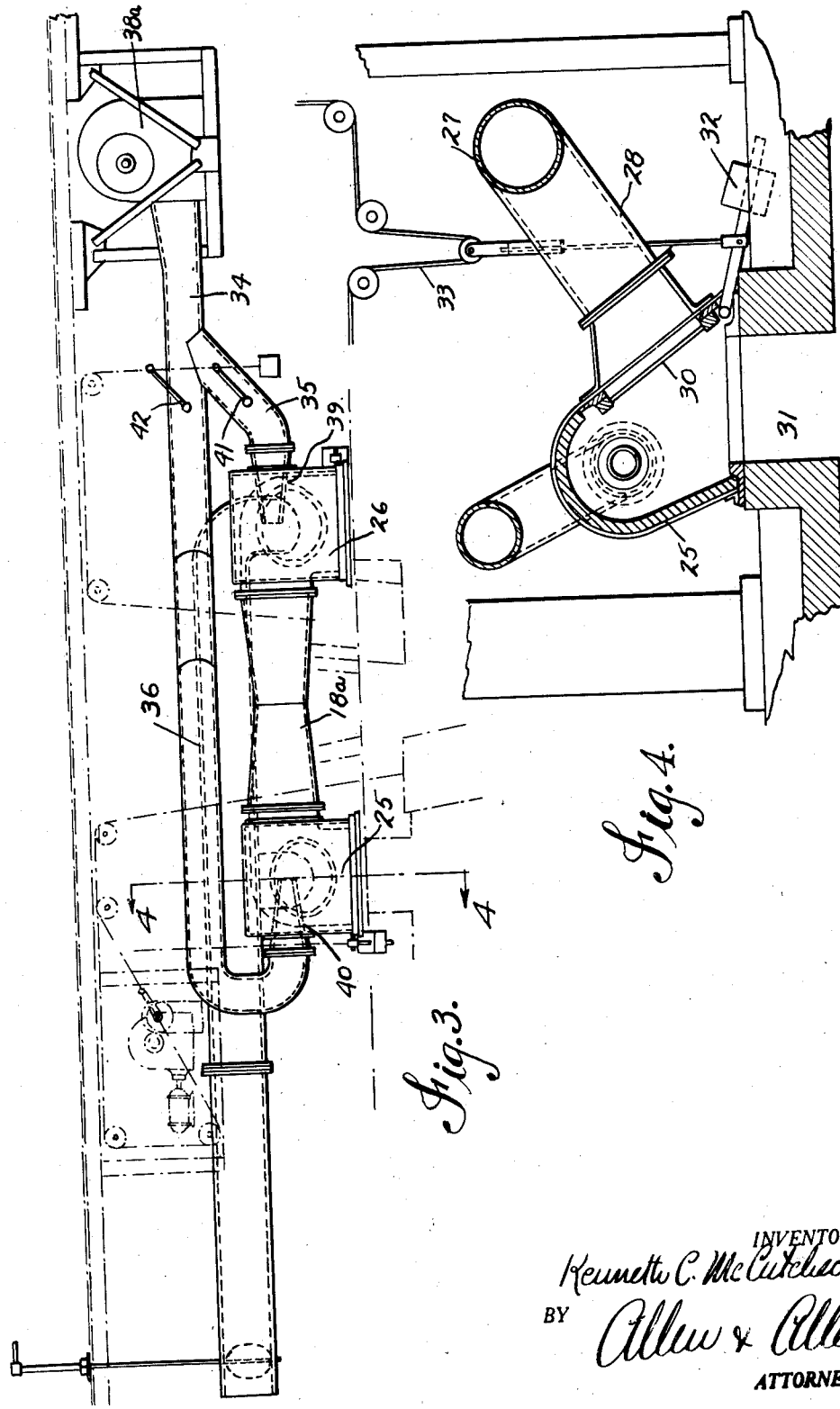

1,874,328

UNITED STATES PATENT OFFICE

KENNETH C. McCUTCHEON, OF ASHLAND, KENTUCKY, ASSIGNOR TO THE AMERICAN ROLLING MILL COMPANY, OF MIDDLETOWN, OHIO, A CORPORATION OF OHIO

RECIRCULATION OF WASTE GASES IN THE OPEN HEARTH FURNACE

Application filed January 12, 1931. Serial No. 508,071.

My invention is addressed to the general subject of the re-introduction of spent gases from the exit end of the furnace into the entrance end of the furnace, either with the incoming combustible gas in some types of furnace or with the incoming preheated air from the checker chambers, or both. The general objects of such a re-introduction, and of course the general objects of my invention, are a better control of combustion, a better control of the extent and direction of the flame, a more perfect correlation of combustion conditions to the condition of the furnace charge during the heat, and a preservation of the furnace under all combustion conditions.

The employment of spent gases in other types of furnaces has been suggested, but the effects of such introduction in said other types of furnaces is not the same as the effect of my invention in the open hearth furnace for the treatment of molten charges of metal. I have a new process of operating the open hearth furnace which I shall describe hereinafter.

Hitherto, by any of those mechanisms which have been suggested for the employment of waste gases in other types of furnaces, it would not be possible to carry on my process in the open hearth furnace, and for this reason the mechanism which I have devised is a part of my present invention. I accomplish the objects of my invention both by that series of process steps and in that mechanism which I shall hereinafter fully set forth. I shall first describe the process and then proceed to a consideration of mechanism which makes that process possible. Reference is made to the drawings, wherein:

Figure 1 is a semi-diagrammatic showing of the elements of an open hearth furnace, together with a semi-diagrammatic view of apparatus directed to the accomplishment of purpose of my invention.

Figure 2 is a plan view of a mechanism designed for the re-introduction of waste gases into the entrance side of a regenerative or open hearth furnace.

Figure 3 is a side elevation thereof.

Figure 4 is a sectional view of one of the entrance devices in my furnace, the section being taken along the lines 4—4 in Figure 3.

In the operation of the open hearth furnace, both during the charging period, i. e. when the cold metal is being introduced into the furnace, and also during the heating period, i. e. when the charge is being reduced to molten condition, the fuel and air are introduced into the furnace, mixed and burnt at as high a rate as possible in order to hasten the process of melting down and the initial process of the oxidation of impurities. The products of combustion are drawn off, passed through checker chambers so as to heat up the brick work therein, and carried away by means of a stack. It will be understood that in regenerative furnaces a reversal is caused to take place at intervals, and the incoming air for combustion, and in some types of furnace the incoming combustible gas, are passed through checker chambers which have previously been heated up by the waste gases during the last reversal.

After the initial period just described, when the charge is hot enough, when great amounts of heat are not being absorbed by the materials being melted down or by the initial chemical reactions, and when the furnace is as hot as it can safely be carried, it is the practice to burn less gas, and less gas and air are introduced into the furnace. When this occurs the burners or ports, having smaller quantities of gases to control, send the flame into the furnace with poor direction, and generally in such a way that combustion does not take place so directly upon the charge as is desirable for the most efficient operation. Combustion shows a tendency to take place within or against the brick work in a destructive fashion, and the walls, and particularly the roof of the furnace are likely to be attacked. It becomes necessary to slow down the operation in order to avoid burning out the furnace, and a slowing down of the combustion rate not only decreases efficiency, but may result in an inadequate heating of the bath. It is customary to try to operate the furnace so as to secure an adequate heat without undue destructive action upon the furnace itself. Again, the smaller amounts of flame and products of combustion do not give the proper charge or bath coverage to carry on the reactions speedily enough. Still another factor to be taken into account in furnace operation is the fact that at one period of the charge the molten metal gives off quantities of combustible gas, which not only makes it possible to cut down the amount of combustible being introduced into the furnace for efficiency's sake, but also renders it still more advisable so to do for reasons hereinabove noted.

At such times both the direction and the action of the flame will be improved if it is possible to increase its volume without increasing either the rate of combustion or the amount of combustible introduced. In some instances it is desirable to decrease the rate of combustion.

I accomplish these things by introducing waste gases primarily into the air used for combustion at such times as the flame may require it for direction, bath coverage, or combustion control. In furnaces burning the low heat value fuels, where a gas checker is employed, I may dilute the gas in this way if desired. My invention is applicable not only to low heat value fuels, but also, and even primarily to high heat value fuels. The dilution of the incoming air and the increasing of its volume without speeding up the rate of combustion not only enables me to direct the flame and to cause it to cover the bath in a more perfect manner, but also to blanket the flame and hold it down upon the bath by a volume of gas above it which protects the brickwork of the furnace.

In ordinary processes of heat treatment of iron and steel, by way of example, the recirculation of waste gases should start soon after the "lime comes up," and should be maintained until tapping time. The volume of waste gases reintroduced into the furnace system will depend upon the B. t. u. input required at the given time in the heat treatment cycle. It may be determined and controlled either by inspection or by calculation, and while it may be accomplished automatically, it is comparatviely easy by inspection and manual control to secure the proper flame direction and coverage with a given amount of combustible by controlling the amount of waste gases being introduced. The waste gases do not have any tendency to lower the efficiency of the regenerative operation of the furnace, inasmuch as they have a considerable degree of heat as they leave the exit checkers and tend in some measure to help pre-heat the incoming gases.

The chief mechanical difficulty connected with the reintroduction of waste gases into the entrance end of the furnace has to do both with the heat of the exit gases, and with the fact that the pressure at the exit end of the furnace is, of course, appreciably less than the pressure at the entrance end of the furnace. This means that to re-introduce waste gases into the system they must be brought to higher pressure, yet they are at such a high temperature that it is uneconomical to handle the volume of waste gases which it is desirable to introduce with a fan or blower. Mechanisms of this type may be secured which are constructed of relatively high heat resistant materials, but they are expensive in first cost, and in spite of their construction, they deteriorate relatively rapidly. I have found that I can re-introduce waste gases commercially with entire success by employing the injector or Venturi principle, abstracting a relatively small quantity of the waste gases by mechanical means, and using this small quantity to raise the effective pressure of a very much larger quantity of the waste gases to a point where they may be brought into the entrance end of the furnace. The relatively small quantity of waste gases so handled mechanically may be cooled if desired to protect the relatively small blower equipment, but this is not so important, inasmuch as the blower is relatively small and its cost is therefore much more nearly negligible.

Instead of abstracting a portion of the waste gases, I may employ a portion of the air being introduced under pressure, employing the Venturi principle to cause this air to introduce a relatively large quantity of the waste gases, and in the exemplary embodiment which I shall now describe, I have shown a form of device in which the waste gases do not pass through my blower equipment.

I have shown in Figure 1 a diagrammatic view of an open hearth furnace assembly, arrows indicating the passage of gases through the furnace upon one of its cycles or reversals. I have indicated broadly at 1 the hearth of an open hearth furnace, having entrance checker chambers 2 and 3, and exit checker chambers 4 and 5. Conduits 2a to 5a respectively connect these checker chambers with a common passageway 6, to a stack 7, and there are provided dampers 8 and 9 in these conduits which may be respectively opened and closed in pairs, as indicated. In the cycle depicted in Figure 1, the dampers 8 are closed, cutting off the checker chambers 2 and 3 from the stack 7. The dampers 9 are open; and the waste gases from the hearth 1 are shown as passing through the conduits 4a and 5a to the stack.

Chambers 2 and 5 in this particular furnace are gas chambers, and I have shown gas inlet conduits 10 and 11 entering respectively the conduits 2a and 5a, and controlled by mush-room valves 12 and 13. On this cycle of the furnace the valve 12 is open, admitting gas to the checker chamber 2, and the valve 13 is closed. I have also shown a pair of conduits 14 and 15 connected with the conduits 3a and 4a respectively by mush-room valves 16 and 17. These conduits are connected to a fan 38, the purpose of which is to introduce air into the entrance end of the furnace. When, as in the figure, the mushroom valve 16 is open and the valve 17 closed, air is being blown by the fan 38 into the checker chamber 3. I have shown a common conduit 18 connected between the conduits 3a and 4a. I have shown in this conduit dampers 19 and 20, which may be employed, as will be readily understood, during that period of the furnace operation when it is not desired to introduce waste gases therein. A third conduit 21 comes from the fan 38 or from a common connection between the conduits 14 and 15, and enters the conduit 18, where it terminates in a venturi or injector nozzle 22, in this instance pointed toward the conduit 3a. In the operation of the furnace gas under pressure will be sent through the checker chamber 2, being introduced by the conduit 10. Air under pressure will also be sent through the checker chamber 3, being introduced by the fan 38, through the conduit 14. A portion of this air will, however, pass through the conduit 21, and by reason of its aspirating effect, will abstract quantities of the waste gases from conduit 4a, and introduce them under sufficient pressure through the conduit 18, into the conduit 3a, whence they will pass with the air through the checker chamber 3. For the introduction of waste gases upon the next reversal of the furnace, the nozzle 22 should, of course, extend in the direction of the dotted lines.

In Figure 2, I have shown entrances through the several checker chambers corresponding to the conduits 2a to 5a in Figure 1, indicated by the numerals 2b to 5b respectively. The stack is again indicated at 7, and there are stack dampers 23 and 24. Since 2b and 3b represent conduits on the entrance end of the furnace, the damper 23 will be closed, and the damper 24 will be open. Headers 25 and 26 are connected respectively with the passages 3b and 4b, and a common connection 18a is shown between these headers. This connection is tapered from both ends toward the middle so as to increase the venturi effect. An air conduit 27 is shown having connections 28 and 29 respective with the headers 25 and 26. The construction of the headers is shown more clearly in Figure 4, where I have shown the header 25 equipped with a valve or damper 30, adapted alternately to close the connection 28 between the header and the air conduit 27, or the opening 31 to the conduit 3b. The damper is counterbalanced by a weight 32 on a lever arm which may be controlled by a rope 33, running over a series of sheaves.

The damper 30 may, of course, be placed in intermediate position.

I have shown in his instance (Figures 2 and 3) a fan 38a, which may in this instance be an auxiliary fan. It is connected by a conduit 34 to branch conduits 35 and 36, which terminate in nozzles 39 and 40 respectively situated in the headers 26 and 25. The action of an air blast through these nozzles will, of course, be to draw in a quantity of the waste gases through the connection between a given header and the adjacent exit checker chambers, and carry that quantity of waste gases through the conduit 18a to the opposite header, thereby introducing said gases into the entrance system. Valves 41 and 42 are arranged alternately to open and close the conduits 35 and 36; and the operation of the several mechanisms which I have described is correlated, as will be readily understood, for each reversal of the furnace. Where an auxiliary fan is used, the pressure of the gas which it delivers may be increased over or may have a fixed relationship to the pressure of the air delivered to the entrance side of the furnace by the main fan or blower. The quantity of gases being introduced may, of course, be regulated by the size of the several parts of my mechanism, the quantity of injecting gas being introduced, the damper openings and the like.

It will be understood that modifications may be made in my invention without departing from the spirit thereof.

Having thus described my invention, what I claim as new and desire to secure by Letters Patent, is:

1. In an open hearth furnace, means for introducing a quantity of air into said furnace under pressure, means for dividing the air being introduced under pressure, and means for causing the divided portion of said air to aspirate into the air stream a quantity of waste gases from the exit end of the furnace.

2. In an open hearth furnace, chambers alternately operating as entrance and exit chambers, a fluid-conductive connection between said chambers, a Venturi device located in said connection, and means for controlling said Venturi device for aspirating gases from one of said checker chambers to the other alternately.

3. In an open hearth furnace, means for introducing the main supply of air under pressure, means for dividing off a portion of said air, and means for causing said portion to aspirate into the remaining main supply waste gases from an exit passage of the furnace.

4. In an open hearth furnace, checker chambers alternately operative as entrance and exit chambers, respectively, headers connected with the respective chambers, a fluid-conductive connection between said headers, air conductors alternatively connectible to the respective headers, and Venturi means in said connection and having an air supply connection with said air-conductors, and being applicable in either direction through said connection.

5. In an open hearth furnace comprising two chambers, either of which is used as a preheater while the other is used as an outlet for the products of combustion, a Venturi device adjustable so as to be applicable to either chamber for forcing a part of the products of combustion from one chamber to the other.

6. In an open hearth furnace, means for introducing a main supply of air under pressure, means for dividing off a portion of said air, and means whereby said divided-off portion forces waste gases into the remaining portion from an exit passage of the furnace.

KENNETH C. McCUTCHEON.